United States Patent
Schermann et al.

(10) Patent No.: US 11,184,241 B2
(45) Date of Patent: Nov. 23, 2021

(54) TOPOLOGY-AWARE CONTINUOUS EVALUATION OF MICROSERVICE-BASED APPLICATIONS

(71) Applicant: INTERNATIONAL BUSINESS MACHINES CORPORATION, Armonk, NY (US)

(72) Inventors: Gerald Schermann, Yorktown Heights, NY (US); Fabio A. Oliveira, Yorktown Heights, NY (US); John Erik Wittern, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 16/271,736

(22) Filed: Feb. 8, 2019

(65) Prior Publication Data
US 2020/0259715 A1 Aug. 13, 2020

(51) Int. Cl.
*H04L 12/24* (2006.01)
*H04L 29/08* (2006.01)

(52) U.S. Cl.
CPC .......... *H04L 41/12* (2013.01); *H04L 41/0816* (2013.01); *H04L 41/0853* (2013.01); *H04L 41/22* (2013.01); *H04L 67/16* (2013.01)

(58) Field of Classification Search
CPC ..... H04L 41/12; H04L 41/0853; H04L 41/22; H04L 41/0816; H04L 67/16
USPC .......................................................... 709/224
See application file for complete search history.

(56) References Cited

U.S. PATENT DOCUMENTS

| 10,007,513 | B2* | 6/2018 | Malladi | G06F 8/70 |
| 10,404,523 | B2* | 9/2019 | Cencini | H05K 7/20745 |
| 10,680,918 | B1* | 6/2020 | Mazzitelli | G06F 9/547 |
| 10,817,398 | B2* | 10/2020 | Cencini | G06F 11/3055 |
| 2017/0046146 | A1* | 2/2017 | Jamjoom | G06F 8/71 |
| 2017/0098172 | A1* | 4/2017 | Ellenbogen | G06N 7/06 |
| 2017/0242784 | A1* | 8/2017 | Heorhiadi | G06F 11/3692 |
| 2018/0039570 | A1* | 2/2018 | Rajagopalan | G06F 11/3688 |

(Continued)

FOREIGN PATENT DOCUMENTS

WO 2018/064236 A1 4/2018

OTHER PUBLICATIONS

Schermann, G et al., "Bifrost—Supporting Continuous Deployment with Automated Enactment of Multi-Phase Live Testing Strategies"; ACM (2016); 14 pgs.

(Continued)

*Primary Examiner* — Moustafa M Meky
*Assistant Examiner* — Elizabeth Kassa
(74) *Attorney, Agent, or Firm* — Intelletek Law Group, PLLC; Gabriel Daniel, Esq.

(57) ABSTRACT

A method and system of determining a health state of a microservice based application includes extracting traces of multiple variants of a microservice-based application. Topologies of the multiple variants are inferred based on the extracted traces. One or more topological differences of each of the multiple variants are identified based on the extracted traces. Each topological difference is ranked. The topological differences of the microservice-based application are displayed on a user interface, including a microservice map of the topological differences and a listing of a top ranking of the topological differences.

20 Claims, 16 Drawing Sheets

(56) References Cited

U.S. PATENT DOCUMENTS

2018/0270122 A1* 9/2018 Brown .................... H04L 69/40
2018/0287876 A1* 10/2018 Strobel ................... H04L 41/12
2020/0112497 A1* 4/2020 Yenumulapalli ........ H04L 51/18

OTHER PUBLICATIONS

Sigelman, B. H. et al., "Dapper, a Large-Scale Distributed Systems Tracing Infrastructure"; Google Technical Report (2010); 14 pgs.
Sambasivan, R.R. et al., "Diagnosing Performance Changes by Comparing Request Flows" Carnegie Mellon University (XXXX); 14 pgs.
Jaeger, "Protobuf Model and gRPC for Internal Communications" (2018); 4 pgs.
Veeraraghavan, K. et al., "Kraken: Leveraging Live Traffic Tests to Identify and Resolve Resource Utilization Bottlenecks in Large Scale Web Services"; USENIX Association, 12th USENIX Symposium on Operating Systems Design and Implementation (2016), pp. 634-651.
Mell, P. et al., "The NIST Definition of Cloud Computing"; NIST Special Publication 800-145 (2011); 7 pgs.

* cited by examiner

TOPOLOGY-AWARE CONTINUOUS EVALUATION OF MICROSERVICE-BASED APPLICATIONS

BACKGROUND

Technical Field

The present disclosure generally relates to network computing, and more particularly, to microservice-based applications that run on a networked computing infrastructure.

Description of the Related Art

In recent years, the cloud computing platform has emerged as the most popular way of providing a wide range of computational resources, such as infrastructure, platform, and application microservices. In this regard, various vendors offer cloud-based solutions to optimize the use of their data centers. Modern cloud-based applications are distributed, heterogeneous, and can scale rapidly to respond to demand. This flexibility is facilitated by the use of a fine-grained microservice-oriented architecture, sometimes referred to as a microservice architecture.

A microservice may offer a single purpose and provide a set of APIs to other microservices, which collectively implement a given application. Such applications ("apps") can be built as a collection of different microservices, instead of as a monolith. Each microservice of a microservice-based application can run on its own and may be created using different coding or programming languages. Big and complicated applications can comprise simpler and independent programs, referred to herein as microservices, which are executable by themselves. These smaller programs are grouped together to deliver all the functionalities of the big, monolithic app. Further, each microservice can be developed, deployed, and managed independent of other constituent microservices of the microservice-based application. New features and updates to a microservice can be continuously delivered in a rapid, incremental fashion, wherein newer versions of microservices can be continually integrated into a production deployment. Microservice-based applications developed in this manner are dynamic as they can be updated and deployed frequently.

SUMMARY

According to various embodiments, a computing device, a non-transitory computer readable storage medium, and a method are provided for determining a health state of a microservice-based application. Traces of multiple variants of a microservice-based application are extracted. Topologies of the multiple variants are inferred based on the extracted traces. One or more topological differences of each of the multiple variants are identified based on the extracted traces. Each topological difference is ranked. The topological differences of the microservice-based application are displayed on a user interface, including a microservice map of the topological differences and a listing of a top ranking of the topological differences. Each topological difference may be a result of a new version of a microservice used by the microservice-based application.

In one embodiment, a change complexity value of each subtree is calculated, originating from a new version of a microservice used by the microservice-based application. The displayed topological differences may include a representation of the change in complexity factor at a root of each subtree.

In one embodiment, ranking each topological difference includes assigning a weighting factor to each microservice in the microservice map, based on predetermined one or more criteria. The one or more criteria may include assigning a lower weighting factor to a topological difference the farther down a subtree originating from a front end of a microservice-based application the topological difference is. The microservice map include one or more subtrees. For each subtree, the weighting factor of each microservice may be additive between microservices of the subtree from, an endpoint of a subtree to a root of the subtree.

In one embodiment, the predetermined criteria for each weighting factor includes assigning a first weighting factor for a call to a common microservice; assigning a second weighting factor that is larger than the first weighting factor for a removed call to a microservice; assigning a third weighting factor that is larger than the second weighting factor for an updated source microservice; and assigning a fourth weighting factor that is larger than the third weighting factor for a new microservice.

In one embodiment, ranking each topological difference includes determining a subtree change factor for each subtree of a topology by calculating, for each subtree, a number of changes for every subtree. For each subtree, a higher ranking is assigned to the subtree, the larger the number of changes for the subtree.

In one embodiment, identifying one or more topological differences of each of the multiple variants of the microservice-based application includes comparing topologies of each of the multiple variants. Topological changes are identified by reaching every end-point level of every microservice used by the microservice-based application.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, the Summary, Detailed Description and the Drawings provided. Moreover, the claimed subject matter is not to be limited by the illustrative details in the Summary, Detailed Description and the Drawings, but rather is to be defined by the appended claims, because the claimed subject matter can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods of providing continuous evaluation of microservice-based applications. Microservices applications are based on a distributed architecture, where the microservices are deployed as separate applications and are accessed remotely through a remote access protocol. Today, aggressive release cycles for applications are salient to an organization's technological success. To that end, runtime techniques to verify how users adopt new features of a microservice, in the form of AB testing, dark launches, or canary releases may be used.

Figure 1:
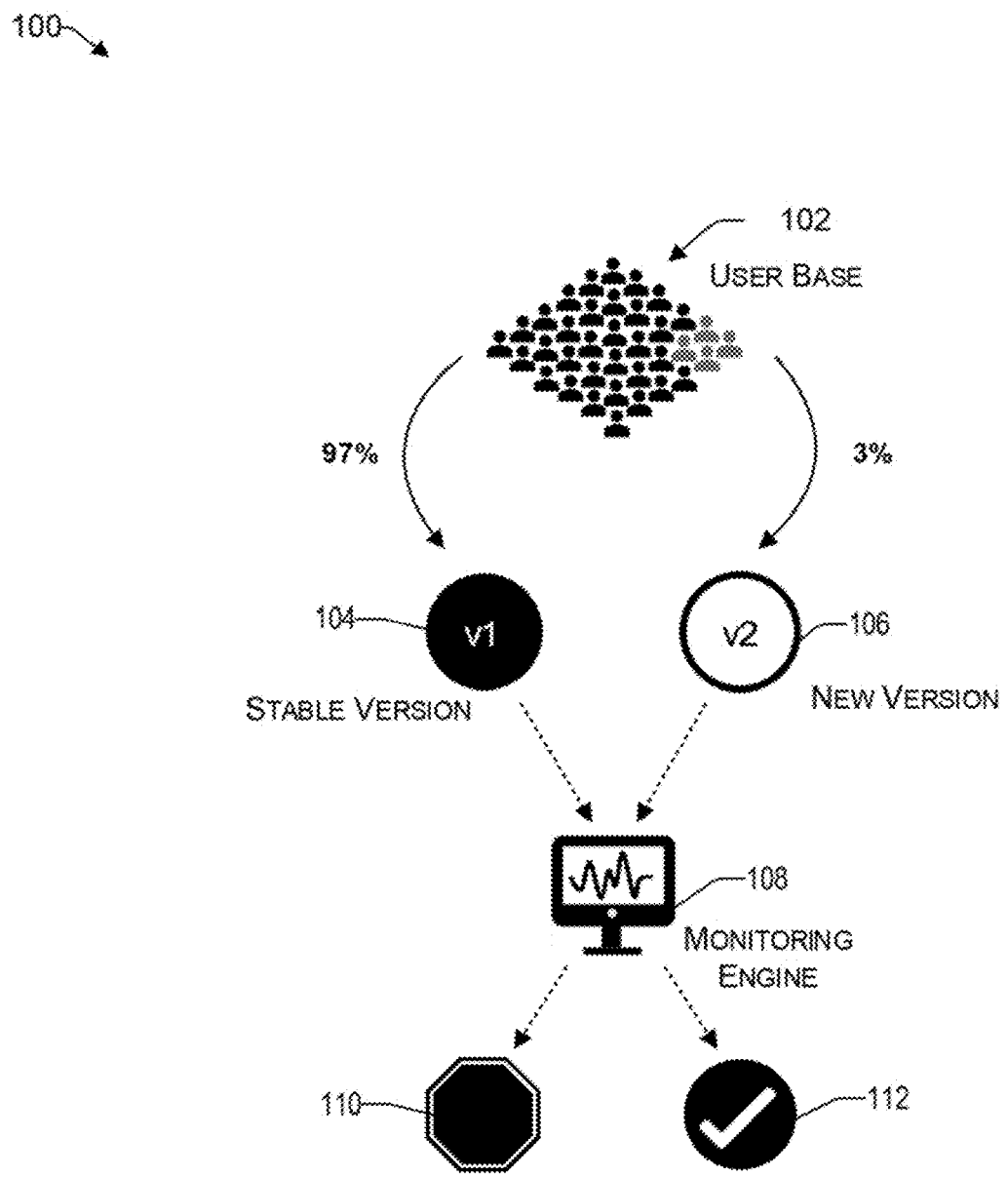
FIG. 1 is a conceptual block diagram of a continuous evaluation scenario, consistent with an illustrative embodiment.

In this regard, FIG. 1 provides a conceptual block diagram 100 of a continuous evaluation scenario, consistent with an illustrative embodiment. Consider, for example, that a new version V2 (106) of logging to a microservice-based application is available. In the example of FIG. 1 a majority (e.g., 97%) of a user base 102 is exposed to a stable version V1(104) of the microservice, whereas a minority (e.g., 3%) of the user base 102 is introduced to a new version V2 (106) of the microservice.

Microservice-based applications provide the opportunity to perform continuous live testing. Such continuous live testing approaches are based on the concept of initially releasing a version of a microservice to a small sample of users (3% in the present example) and then monitoring for runtime faults, performance issues, or other relevant metrics. Based on such performance, the release can be expanded, or throttled back. If the new version 106 has an adverse impact, a hotfix can be provided or a rollback performed to the original stable version) to keep the impact of a new version 106 under control, represented by symbol 110. However, if the new version 106 is deemed not to have an adverse impact on the microservice-based application, then it may be approved, represented by symbol 112, and the release of the new version 106 expanded to the user base 102, accordingly.

In known systems, a myriad of microservices and endpoints and frequent deployments (e.g., updates to microservices) makes it challenging to stay aware of the changes and to understand the impact to a microservice-based application. In this regard, FIG. 1 illustrates a monitoring engine 108, which is a program that can run on a server or a distributed computing platform (such as the cloud) and is configured to determine a health state of a microservice-based application in view of changes presented by the microservices it uses. The monitoring engine 108 is operative to access the various versions (e.g., V1 (104) and V2 (106)) of a microservice that supports a microservice-based application to determine the performance (e.g., an impact) of the new version 106 on the microservice-based application. Each different version being evaluated can be interpreted as a different evaluation being run on the microservice-based application. For example, the error rate, response time, delay, CPU load, memory load, etc., may be evaluated for the microservice-based application for the new version 106 of a microservice.

While the microservices under evaluation may be the focus of interest, changes to other parts of the application caused by the new version of the microservice 106 may have relevant impact on the microservice-based application, sometimes referred to herein as the health state of the application. Stated differently, in one aspect, instead of simply monitoring the effects of a microservice regarding its intended function, the overall health state of the application can be evaluated with respect to each evaluation performed by the monitoring engine 108. The parameters of the health state may vary based on the type of the microservice-based application. For example, salient considerations may include, without limitation, percentage of successful requests, error rate, response time, etc.

To that end, traces of multiple variants of a microservice-based application are extracted. One or more topological differences of each variant are identified based on the extracted traces. Each topological difference is ranked. A graph of the topological differences of the microservice-based application are then displayed on a user interface associated with the monitoring engine 108.

In one embodiment, the microservice-based application and/or the microservices supported thereby are provided by computing resources of a cloud (not shown in FIG. 1), which may comprise a private or public cloud computing system. For example, the various components of the cloud can communicate with each other over a network accessible by the monitoring engine 108 and/or LANs and WANs that are part of the cloud. In one embodiment, the cloud provides a microservice fabric of microservices that facilitate the operation of complex microservice-based applications. The architecture of the cloud is discussed in more detail later in reference to FIGS. 14 and 15.

By virtue of the concepts discussed herein the performance of a microservice-based application can be improved. More particularly, microservice-based applications can run in a more stable way. In one aspect, the technical solution discussed herein is platform independent and can be applied to any system that supports the collection of distributed trace information and can be implemented and integrated with existing solutions for distributed tracing, such as ZipKin, Jaeger, and Istio. Still further, the microservice-based application need not be modified during the testing; rather, it is seen as a black box that is being tested.

While known distributed tracing tools provide rudimentary traces and timing information, they do not provide a visualization of what has changed, what microservices were newly added, and/or what microservice endpoints are no longer called. Further, known solutions do not provide guidance as to the salient changes and the health state of the microservice-based application. The novel interface discussed herein allows for rapidly accessing and processing information of a potentially complex microservices-based system by highlighting changes that are occurring and their potential impact on the health state of the microservices-based application. The techniques described herein may be implemented in a number of ways. Example implementations are provided below with reference to the following figures.

Conceptual Overview

Figure 2:
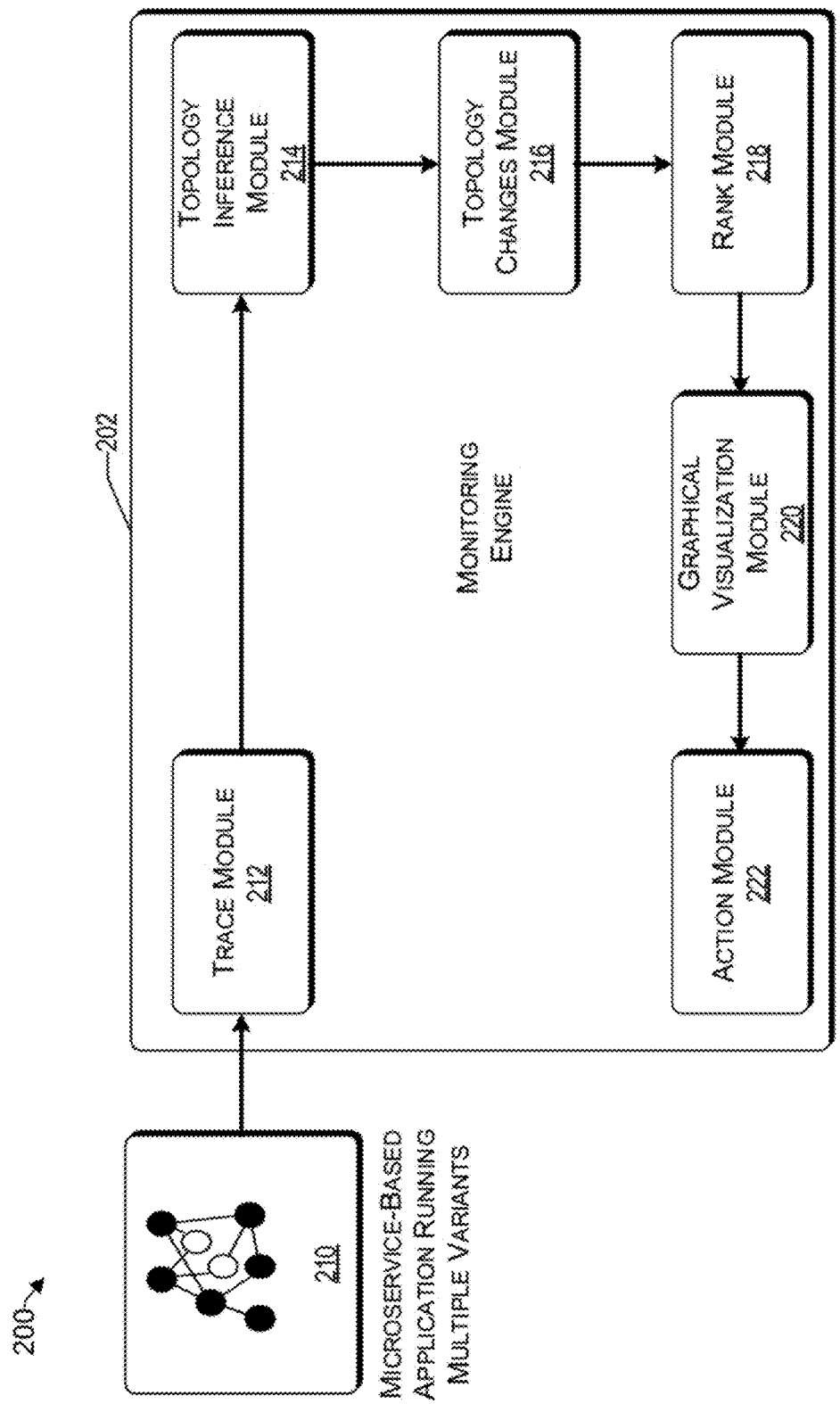
FIG. 2 is a conceptual block diagram of different modules of a monitoring engine, consistent with an illustrative embodiment.

FIG. 2 is a conceptual block diagram 200 of different modules of a monitoring engine 202, consistent with an illustrative embodiment. The input to the monitoring engine 202 is a microservice-based application having multiple variants. For example, one or more of the microservices of the microservice-based application have different versions, leading to different traces. As used herein, traces are logs of requests flowing through a microservice-based application. A single trace typically represents a sequence of all interservice calls resulting from a top-level action performed by an end user of the application, which can thus involve any number of microservices. A trace comprises information including, without limitation, which microservice calls which microservice, and timestamps regarding when calls are being sent and answers received. The trace module 212 of the monitoring engine 202 is operative to extract traces of multiple variants of the microservice-based application 210. In various embodiments, different distributed tracing tools, such as ZipKin, Jaeger, and/or Istio can be used by the trace module 212 to extract detailed traces.

The topology inference module 214 is operative to infer the different topologies of the multiple variants of the microservice-based application 210 from the traces received from the trace module 212. As used herein, a topology relates to information about the logical relationships between microservices. One example of such logical information is that microservices call one another. This information can be obtained from traces (either from a single trace or from aggregating multiple traces by the trace module 212). When deriving a topology from multiple traces, a topology would include any relationship between microservices described in the traces. Alternatively, it is also possible for the topology inference module 214 to include only relationships between microservices if they occur in a significant number of traces. In some embodiments, topologies can be enriched with additional information, such as, without limitation, the average response time of calls between microservices, which can be calculated from the data in the traces, provided by the trace module 212. Accordingly, there is a close relation between traces, which are based on the logged data, and topologies, which are based on the information about the logical relationships between microservices.

For every variant of interest: (i) traces can be filtered, thereby restricting the analysis to those traces of the variant under consideration by the trace module 212; (ii) the remaining traces can be clustered together (e.g., aggregate microservice calls with the same source and destination endpoints) by the trace module 212; (iii) the clustered traces are analyzed and various parameters recorded (e.g., endpoints of each version, which microservice calls which other microservice, etc., by the trace module 212); and (iv) the resulting inferred different topologies can be stored by the topology inference module 214 to then be used by the topology changes module 216.

There is a topology changes module 216 operative to identify one or more topological differences of each variant based on the extracted traces. To that end, the topology changes module 216 may be receive input from the trace module 212 and/or the topology inference module 214. For example, the topological differences can include a location within call traces where changes among the variants took place. Thus, topologies are compared and fine-grained topological changes at the endpoint-level are identified. In this regard, it is noted that a microservice-based application can have various endpoints. By way of non-limiting example, for a search microservice, the various endpoints can be to search (i) news forums, (ii) shopping links, (iii) videos, (iv) images, etc. Thus, the granularity of the comparison of the topologies can reach endpoint level. The identification and presentation of these topological changes are discussed in more detail later.

The monitoring engine 202 includes a rank module 218. In various embodiments, the rank module 218 is operative to receive information from the topology changes module 216 and rank each topological change based on its potential impact to the health state of the microservice-based application. The monitoring engine 202 may receive the parameters (e.g., criteria) for ranking from an owner or administrator of the microservice-based application being analyzed (not shown in FIG. 2). In some embodiments, the monitoring engine 202 receives the parameters from a reference database that is configured to provide the parameters of interest for different types of applications. For example, for some types of microservice-based applications, performance (e.g., execution speed) is important, whereas for others, security and reliability is more important.

In one embodiment, the monitoring engine 202 includes a graphical visualization module 220 operative to display a graph of the topological differences of the microservice-based application, on a user interface. The information displayed on the user interface is based in part on information received from the rank module 218. Examples of graphical visualization are provided later.

The action module 222 helps determine whether one or more versions (e.g., releases) of microservices of a microservice-based application should be released, expanded, or throttled back (e.g., hotfix provided or a rollback performed to the original stable version) based on analysis performed by the trace module 212, topology inference module 214, topology changes module 216, and the rank module 218, such that the health state of the microservice-based application is optimized.

Example Topological Change Types

As discussed above, the topological differences of the variants of microservice-based applications can be provided in the form of a graphical outputs. The following figures provide non-limiting examples of some scenarios. For discussion purposes, all relevant changes may not be highlighted in each figure to avoid obfuscation of the main feature being discussed. Solid filled circles indicate no change; hollow circle indicates a new version; a dotted circle or line indicates removal; a cross-hatched circle indicates a new endpoint; and a dash-dot line indicates that a same endpoint is called, but the calling endpoint has a new version. It will be understood that the concepts discussed herein are not limited to these particular graphical representations—other indicia, such as color coding, shapes, and patterns can be used as well.

Figure 3:
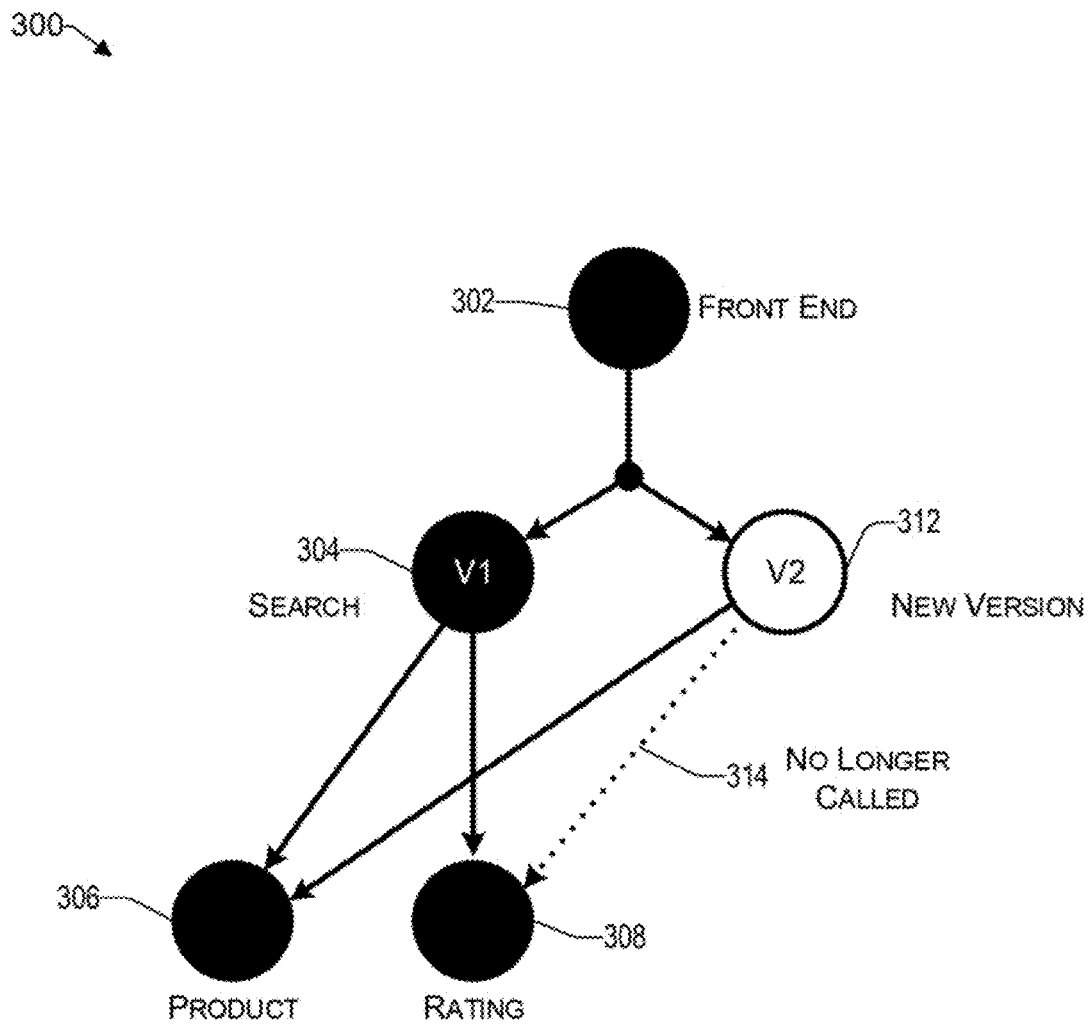
FIG. 3 is a microservice map that includes topological differences of variants of a microservice-based application, consistent with an illustrative embodiment.

Reference now is made to FIG. 3, which is a microservice map 300 that includes a representation of topological differences of the variants of a microservice-based application, consistent with an illustrative embodiment. In the example of FIG. 3, an initial topology of the microservice-based application includes a front end 302 that is coupled to a search microservice 304. The search microservice 304 invokes (i.e., calls) a product microservice 306 and a rating microservice 308. The microservice under evaluation is that of the search function, having a new version 312. It will be understood that the functions of the microservices discussed herein, such as "search," "product," "rating," etc., are provided by way of example only and not by way of limitation. The topology of the microservice-based application having a new version for the search microservice is essentially overlaid on the first topology (based on the first version of the search microservice 304). Microservice map 300 indicates that this new version 312 of the search function no longer calls the rating microservice 308, represented by the dotted line 314.

Figure 4:
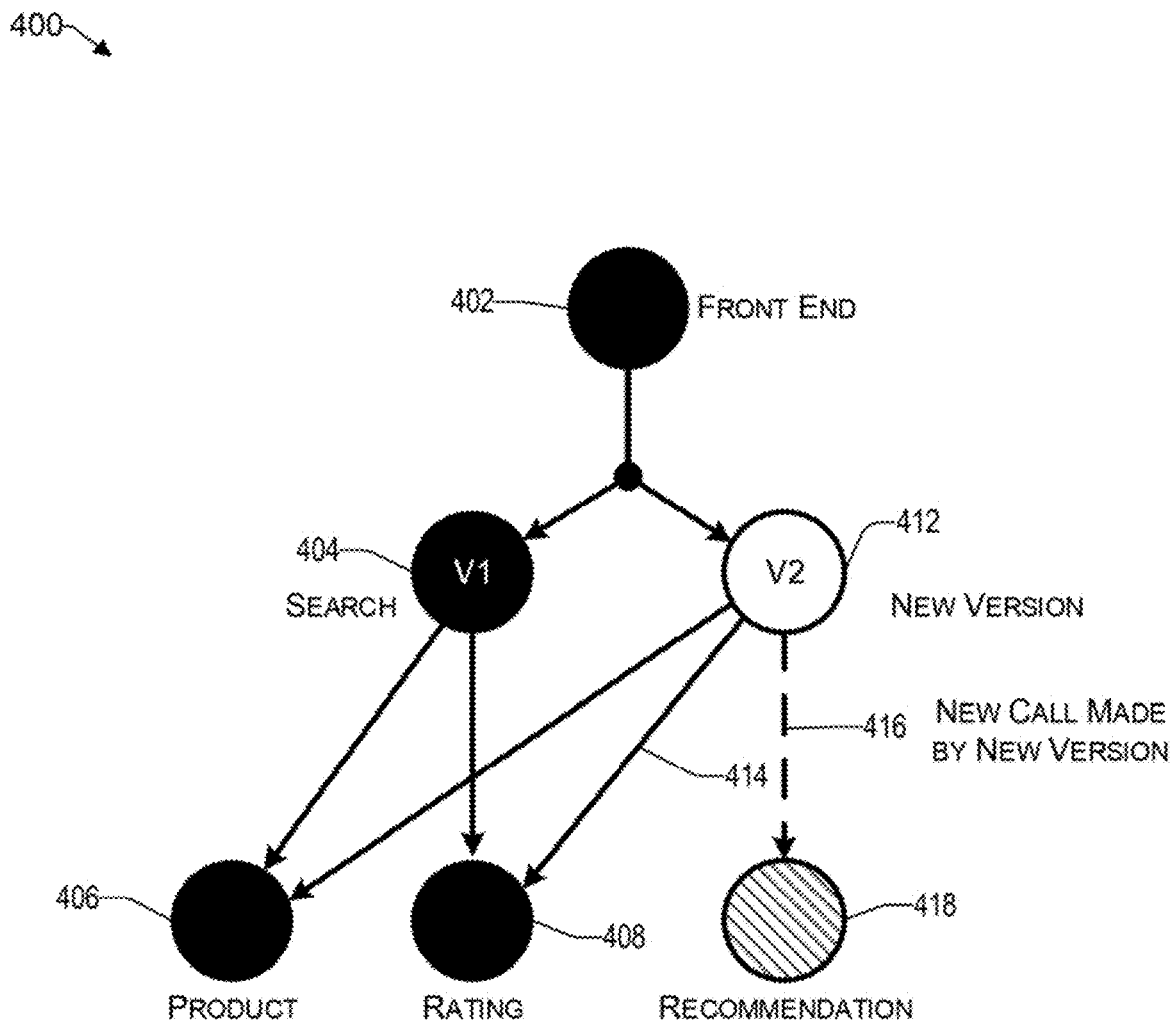
FIG. 4 is a microservice map that includes a new version of a microservice that calls a new microservice.

The monitoring engine can also identify when a new microservice is called in a new version. In this regard, FIG. 4 is a microservice map 400 that includes a new version of a microservice that calls a new microservice 418. In the example of FIG. 4, the second version 412 of the search microservice is similar to that of the first search microservice 404 in that both versions 404 and 412 invoke a product microservice 406 and a rating microservice 408. However, the new version 412 further invokes (i.e., makes an additional call to) a new recommendation microservice 418, which is a new endpoint. The new call is represented by a dashed line 416.

Figure 5:
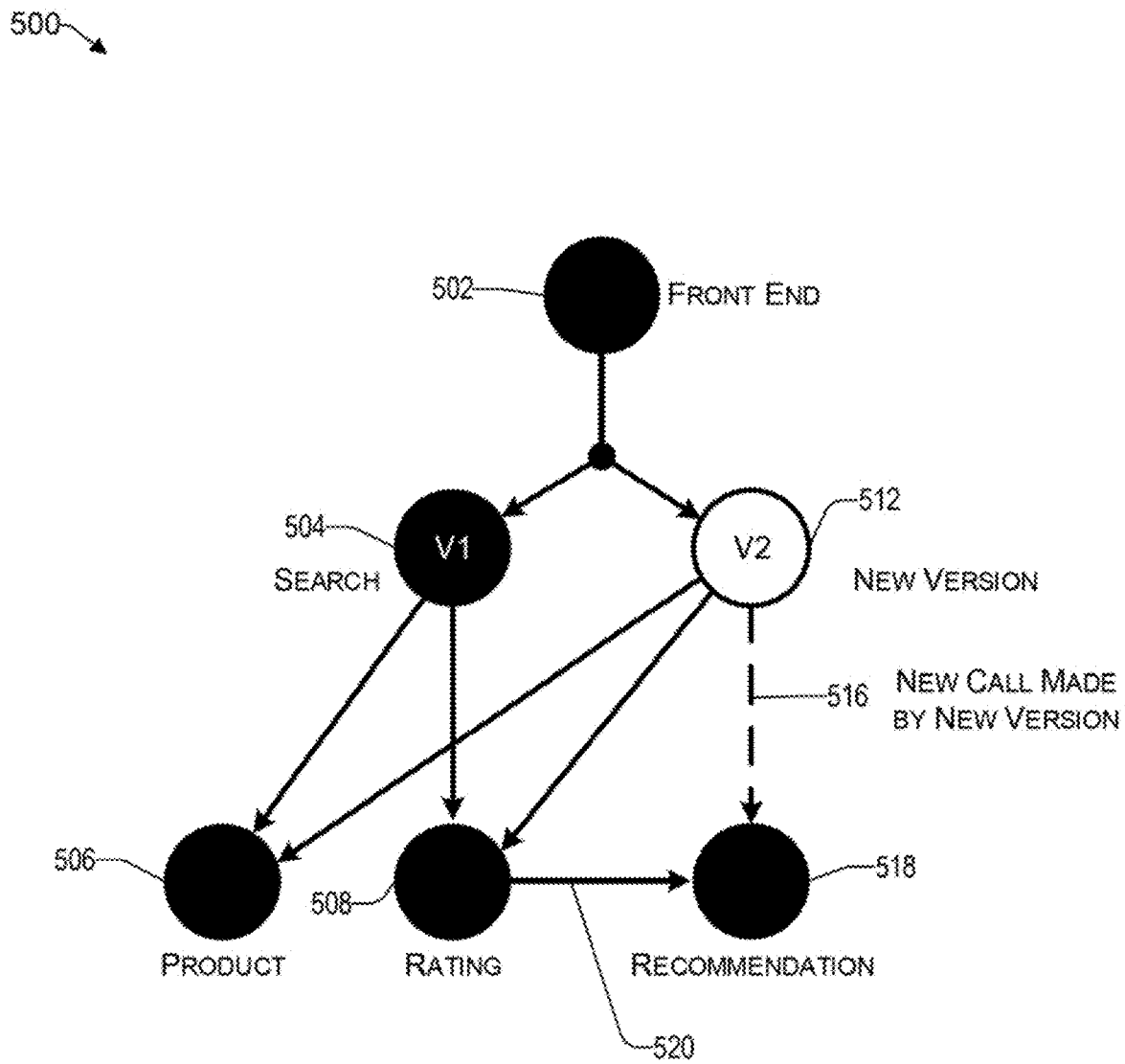
FIG. 5 is a microservice map that characterizes multiple types of topological changes, consistent with an illustrative embodiment.

FIG. 5 is a microservice map 500 that characterizes multiple types of topological changes, consistent with an illustrative embodiment. Microservices 502 to 512 and the interactions therebetween are substantially similar to those of 402 to 412 discussed in the context of FIG. 4 and are therefore not repeated here for brevity. In FIG. 5, the rating microservice 508 includes an additional call 520 to a recommendation microservice 518. The new version of the microservice 512 has a similar topology but includes an additional call from the new search microservice 512 to the recommendation microservice 518, which was previously used as an endpoint of the rating microservice 508. Stated differently, the new version 512 includes an additional call to an endpoint of an existing microservice 518.

Figure 6A:
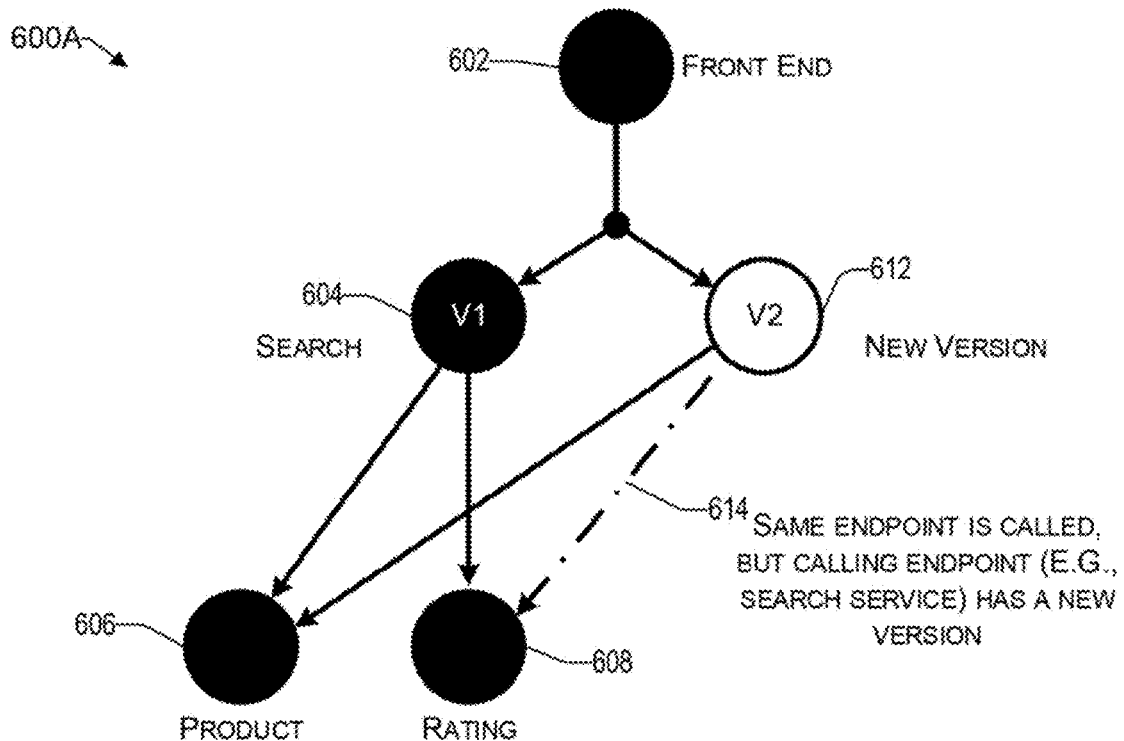
FIG. 6A is a microservice map that characterizes a removed call and a new call to an existing microservice endpoint, consistent with an illustrative embodiment.

FIG. 6A is a microservice map 600A that characterizes an updated caller version, which is a combination of removing a service call and adding a service call to an existing endpoint. In the first variant of the microservice-based application, search microservice 604 in the first version performs a call to an endpoint of the rating microservice 608. In the second version 612 of the microservice-based application, that call no longer exists, but the new (second) version 612 of the search microservice adds a new call 614 to the same endpoint of rating microservice 608.

Figure 6B:
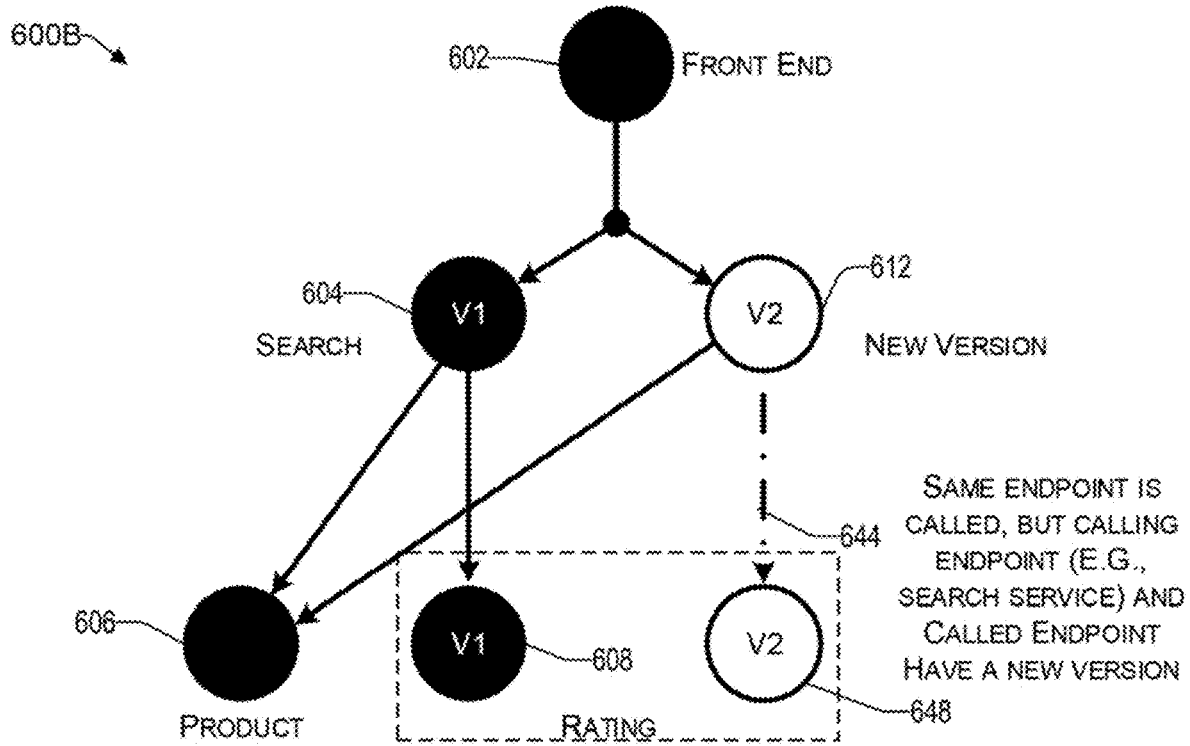
FIG. 6B is a microservice map that characterizes an updated caller version, which is a combination of removing a service call and adding a service call to a new version of an endpoint.

FIG. 6B is a microservice map 600B that characterizes an updated caller version, which is a combination of removing a service call and adding a service call to a new version of an endpoint. In the first variant of the microservice-based application, search microservice 604 in the first version performs a call to an endpoint of the rating microservice 608. In the second version 612 of the microservice-based application, that call no longer exists, but the new (second) version 612 of the search microservice adds a new call 644 to a new (second) version of the rating microservice 648.

Figure 7:
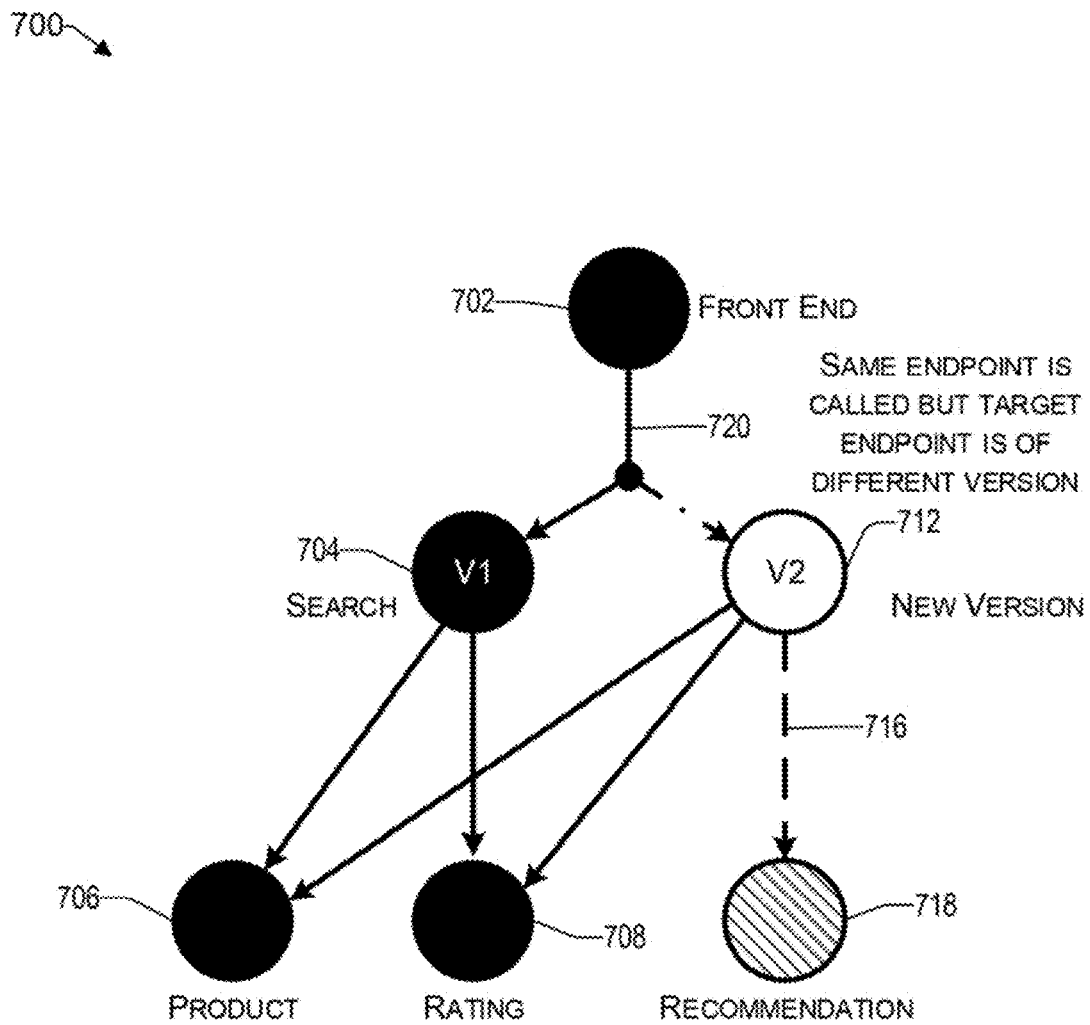
FIG. 7 is a microservice map that indicates a new version of a microservice, wherein the new version has a new endpoint, consistent with an illustrative embodiment

FIG. 7 is a microservice map 700 that indicates a new version of a microservice, wherein the new version has a new endpoint, consistent with an illustrative embodiment. For example, the initial topology of the microservice-based application includes a front end 702 that is coupled to a search microservice 704. The search microservice 704 invokes a product microservice 706 and a rating microservice 708. In the example of FIG. 7, the microservice map 700 indicates that a new version of the search microservice 712 is available by way of highlighting the new version (i.e., hollow circle in the present example), as well as highlighting the portion of the path that initiates a new path 720 (i.e., by way of a dash-dot in the present example). The microservice under evaluation is that of the search function, having a new version 712. The new version of the search microservice 712 invokes the same product and rating microservices 706 and 708, but also invokes a new endpoint microservice 718 (e.g., performing a recommendation function in the present example). The new microservice 718 is highlighted by way of example by a diagonal pattern and the new path leading thereto is highlighted by a dotted line 716.

Figure 8:
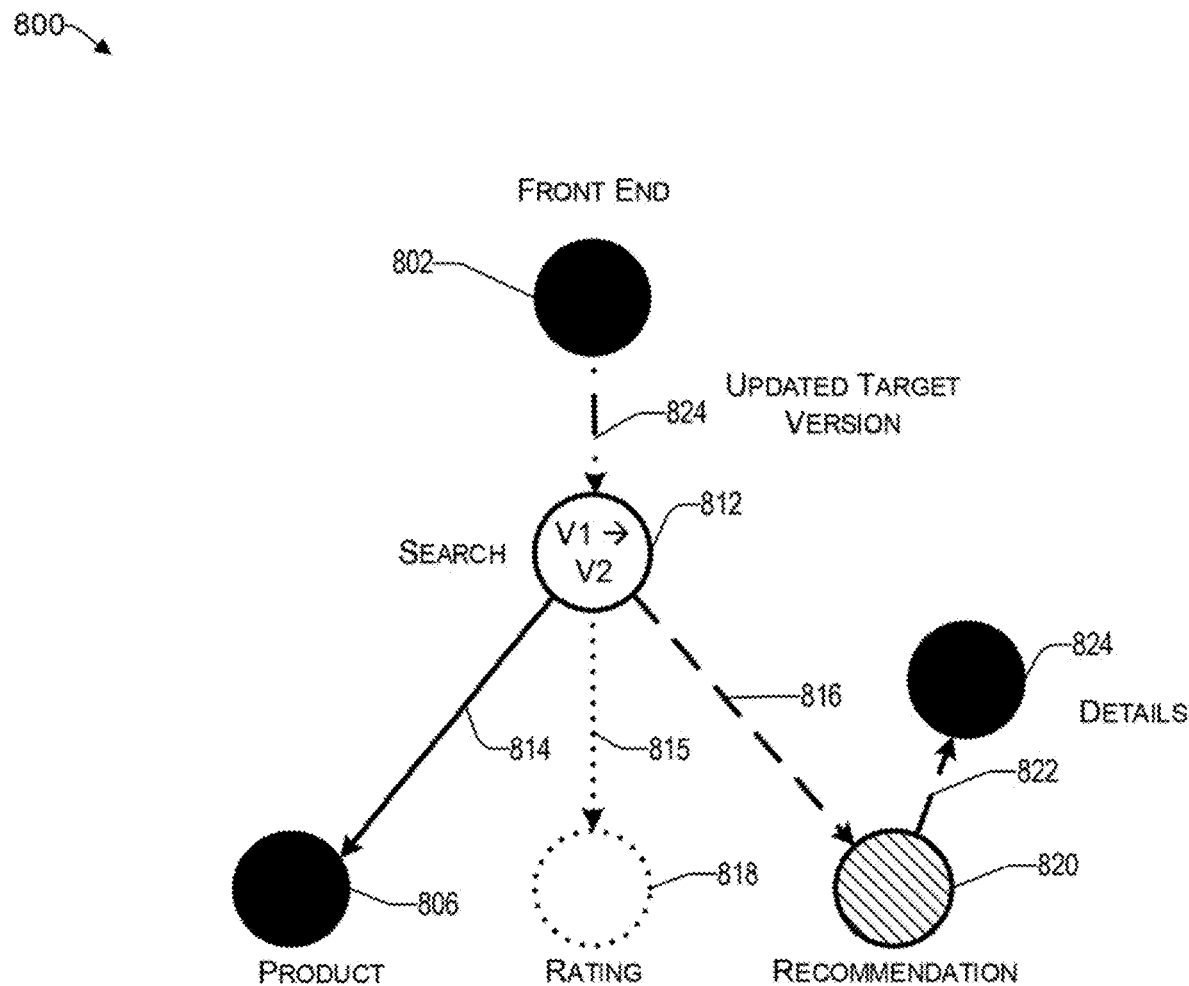
FIG. 8 is a microservice map of a summary view of the inferred topology change types of the variants of a microservice-based application, consistent with an illustrative embodiment.

FIG. 8 is a microservice map 800 of a summary view of the inferred topology change types of the variants of a microservice-based application, consistent with an illustrative embodiment. By way of non-limiting example, microservice map 800 illustrates an unchanged front end microservice 802. The dash-dot line 824 between the front end microservice 802 and the search microservice 812 indicates that the connection 824 leads to a microservice that includes an updated version, namely the search microservice 812 (illustrated as a hollow circle with the names of the versions identified). Thus, instead of displaying the divergent microservice versions separately, they are represented by a common block. Since the product microservice 806 does not change between versions, it maintains its original symbol (e.g., solid circle) and the path thereto 814 is represented by a solid line 814.

The microservice map 800 indicates that a rating microservice 818 is removed in the new version by way of a dotted line 815 leading to the removed microservice 818 (i.e., highlighted by way of a hollow dotted line). The microservice map 800 further indicates that a new microservice 820 (highlighted by a diagonal patterned circle) is invoked by the new version of the search microservice 812. The path to the new microservice 820 is highlighted by a dashed line 816.

The new microservice 820 calls a details microservice 824 endpoint. Since the details microservice 824 is pre-existing it is not highlighted by a diagonal patterned circle. Instead, the path between the new microservice 820 and the endpoint 824 is highlighted a dashed line 822.

Example Ranking of Topological Changes

In one embodiment, the changes are ranked according to the potential impact on the microservice-based application's health state. For example, once the graph-based topological difference is built, a two-phase graph-traversal algorithm may be used for ranking topological differences comprising the annotation and the extraction phases. The algorithm's traversal of a topological difference may be conducted bottom-up. In a first step, all endpoints (i.e., nodes in the graph) without outbound calls are visited (and marked as such). Then, the algorithm visits those endpoints calling service endpoints that have been flagged as visited, marking them as visited again. This process is repeated until all nodes in the graph are visited. Potential cycles are identified and handled based on the temporal order of calls, which is captured in the underlying traces.

Various factors can be considered for ranking. For example, ranking the number of changes for every subtree, referred to herein as a subtree change factor, may be considered. Subtrees that include higher subtree change factors are assigned a higher ranking (i.e., indicating a potentially higher impact to the health state of a microservice-based application). In various embodiments, an entire subtree could be ranked or each change separately within the subtree.

In one embodiment, a change may have an additive weighting factor. Indeed, some functions of microservices may be considered more important (i.e., have higher potential impact) on a microservice-based application. For example, a login function may be deemed more critical than a spell-check function for a particular application. In this regard, the microservices that are more critical are attributed a larger weight factor.

In some embodiments, the weighting factor of each change is based on its proximity to the front end of the microservices-based application. The farther down the tree (e.g., separated by more microservices), the lower the impact of the change may be deemed, and thus, a lower weighting factor is attributed. In various embodiments, predetermined weighting factors are provided by a reference database associated with the microservice-based application and/or a reference table. For example, the reference table may assign a weighting factor of: 0 for a common call; 1 for a removed call; 1 for calling an existing microservice; 2 for an updated source; and 3 for a new microservice. It will be understood that other weighting factors can be used as well. Accordingly, the approach is based on the concept that different change types include different levels of uncertainty and should thus be ranked differently. For example, if a new microservice is called, whose behavior and quality are not yet accessed, this call would be marked as a change introducing relatively more uncertainty.

As used herein, a common call means, by way of example, that v1 of service A called service X, and that v2 of service A also calls service X. In contrast, calling an existing microservice means that v2 of service A also calls service Y, wherein service Y has existed in the past, so we know some things about it.

Figure 9A:
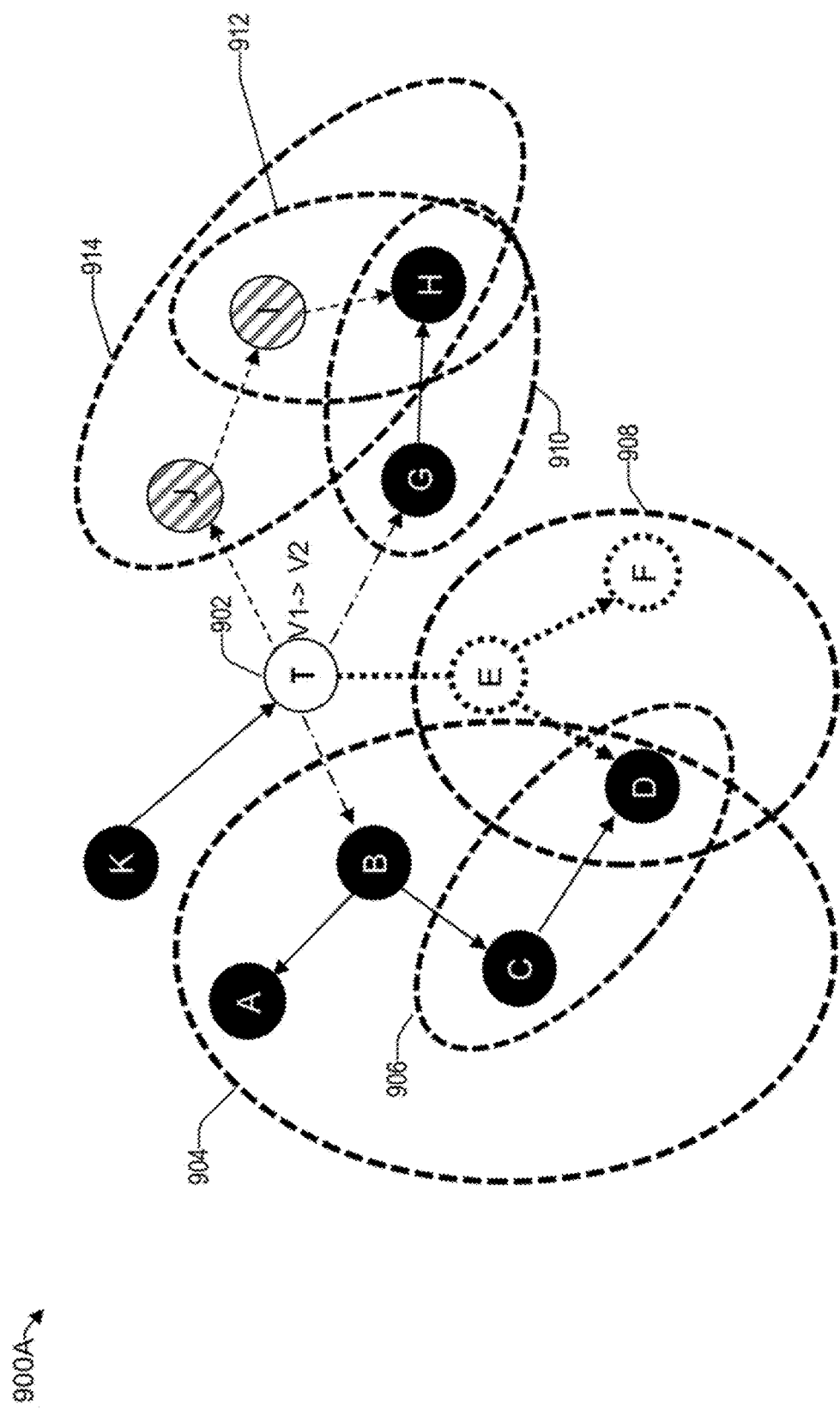
FIG. 9A is a microservice map summary, consistent with an illustrative embodiment.

These concepts can be better understood in view of FIG. 9A, which is a microservice map summary 900, consistent with an illustrative embodiment. For example, microservice K may be a front-end of a microservice-based application, which calls on microservice T (902), which has a new version. The new version no longer calls on microservices E and F. Accordingly, subtree 908 encompassing microservices D, E, and F (highlighted by way of an ellipsis) indicates a subtree change factor of 2 (i.e., removed call E+removed call F) since microservice D remains intact.

Another subtree 904 comprising microservices A to D, remains unchanged and therefore has a subtree change factor of 0. Similarly, subtree 910, comprising microservices G and H, remains unchanged and therefore has a subtree change factor of 0. In contrast, subtree 914 includes several changes, namely new microservices J and I. Microservice H is pre-existing and therefore does not contribute to the subtree change factor, resulting in a subtree change factor of 2 (i.e., 1 for each of new services J and I). A subtree may include a nested subtree, represented by way of example by subtree 906 (i.e., comprising microservices C and D), and subtree 912 (i.e., comprising microservices I and H).

As illustrated in FIG. 9A, one microservice may lead to another microservice, and so on, referred to herein as a cascading effect. Such cascading effects can be evaluated by the monitoring engine by way of downward propagation or upward propagation. For example, upward propagation calculates the effects of a subtree by beginning with the endpoint of the subtree (e.g., D) and moves up to the calling microservice (e.g., T). In downward propagation, the analysis begins at the root (i.e., calling microservice T in the example of FIG. 9A) and is then moves down to the endpoint of the subject tree (e.g., B to C to D). These concepts may be better understood in view of FIG. 10, discussed below.

Figure 9B:
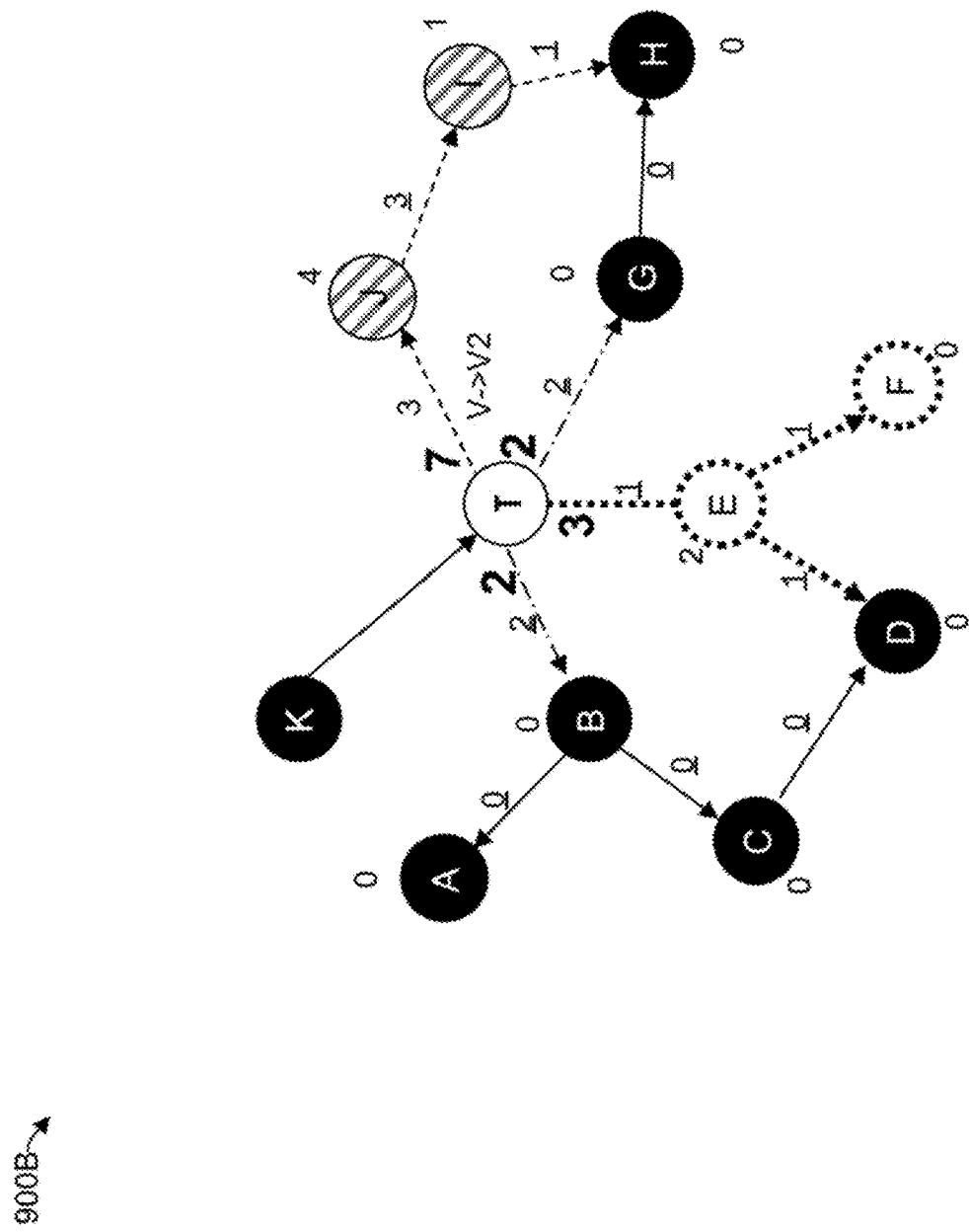
FIG. 9B is a microservice map summary that includes weighting factors, consistent with an illustrative embodiment.

Reference now is made to FIG. 9B, which is a microservice map summary 1000 that includes weighting factors, consistent with an illustrative embodiment. In contrast to FIG. 9A discussed above, the ranking heuristic of FIG. 9B does not only count the number of changes in a subtree but weighs them as well. In the example of FIG. 9B, subtree A to D does not have a subtree change factor. However, it is attributed a weighting factor of 2 because it has an updated source (i.e., microservice T). Accordingly, it results in a change complexity of 0 (from B to A)+0 (from C to D)+0 (from B to C)+2 (due to updated source T)=2.

As to subtree E, D, and F, the call from microservice E to microservice D is removed providing a weighting of 1. Similarly, the call from microservice E to microservice F is removed, providing a weighting factor of 1. Since microservice E is removed, the call from microservice T to E is removed, providing an additional weighting factor of 1. Accordingly, the resulting change complexity for subtree E, D, and F is 1 (from D to E)+1 (from E to F)+1 (from T to E)=3.

Subtree G to H does not have a subtree change factor. However, it is attributed a weighting factor of 2 because it has an updated source (i.e., microservice T). Accordingly, it results in a change complexity of 2.

Subtree J, I, and H includes two new microservices (i.e., J and I), while microservice H remains unchanged. A weighting factor of 1 is attributed to a call from the new microservice I to an existing microservice H. Further a weighting factor of 3 is attributed to a call to a new microservice I, as well as J. Accordingly, the resulting change complexity for subtree J, I, and H is 1 (from I to H)+3 (from J to I)+3 (from T to J)=7. Thus, the subtree J, I, and H is ranked the highest, having a change complexity of 7; followed by subtree E, D, and F, having a change complexity of 3; and followed by subtrees A, B, C, and D, as well as E, D, and F, each having a change complexity of 2.

Figure 10:
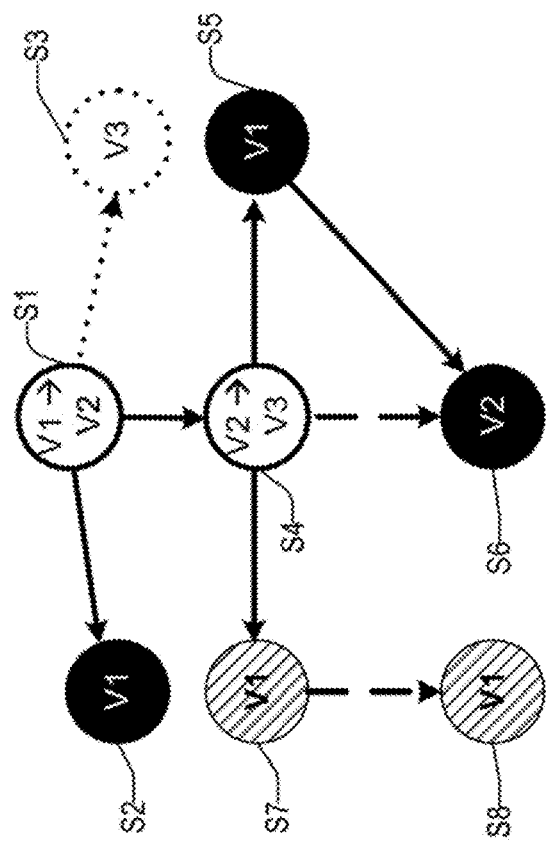
FIG. 10 is a graph structure having multiple trees, consistent with an illustrative embodiment.

In one embodiment, the monitoring engine analyzes substructures of a topological difference and uses the concept of uncertainty in the context of evaluations. In this regard, FIG. 10 illustrates an example graph structure 1000 having multiple trees, consistent with an exemplary embodiment. The graph structure 1000 is broken down into multiple subtrees including microservices S1 to S8. The fundamental idea of this heuristic is that the more complex the structure of the (sub-)tree is, the more likely it includes changes that affect the outcome of the evaluation and the application's health state. Initially, every node a has an assigned state of $T_a=0$. Whenever a node a is visited during the algorithm's annotation phase, its state $T_a$ is set to the expression below.

$$T_a = \Sigma_1^n T_i + p_{a,i}$$

Where: $1 \leq i \leq n$ the (child) nodes of the outgoing calls of a.

Thus, the state values $T_i$ of called nodes i are summed up and weights $p_{a,i}$ representing individual propagation factors for these calls are added. During the extraction phase, for every interaction of a node a with a node i, the score for this edge e is computed as follows:

$$S_e = T_i + C_{a,i}$$

Thus, the score is built from the state value $T_i$ of the node (i.e., service endpoint) that is being called and an individual scoring factor $c_{a,i}$ for this edge. The distinction between propagation and scoring factors serve the following purposes. The propagation factor directly influences the state values of the nodes (and thus the individual scores) when walking up the tree. This is useful if severe issues within a subtree are detected that should be reflected in the ranking of the changes. The scoring factor only influences individual scores, e.g., a single change. It allows expressing fine-grained differences among the changes. In one embodiment, depending on how propagation and scoring factors are chosen, a subtree complexity heuristic can be used to allow for multiple variations. In this regard, Table I provides an overview of the different variations including their concrete propagation and scoring factors.

TABLE 1

Variations of Subtree Complexity Heuristic

| Variation | Propagation Factor p | Scoring Factor c |
|---|---|---|
| ST | 1 | 1 |
| ST Unc | 1 | $U_{type}$ (Change Type Uncertainty) |
| ST Unc Prop | $U_{type}$ | $U_{type}$ |
| ST Pen | 1 | P (Penalty) |
| ST Unc Prop & Pen | $U_{type}$ | $U_{type}$ + P |

For example, the subtree (ST) is a basic type of the heuristic that analyzes the structural complexity of the difference graph by counting the number of interactions (i.e., edges) within subtrees. Propagation and scoring factors are set to 1 for all edges independent of their change types.

The Uncertainty (ST Unc) variation of Table 1 introduces the concept of uncertainty. Calling entirely new services compared to calling a new version of an existing service leads to a different degree of uncertainty when assessing the application's health state. For the former, no information to compare to (i.e., previous calls or historical metrics) exists, while for the latter calls to the new version can be compared with previous calls. Deviations in metrics, such as response times or error rates, can be considered. Similarly, when a new call to an existing endpoint is made, even though a direct comparison on the interaction-level is not possible, there are still metrics available that are associated to the called service allowing an assessment whether this added call introduces unwanted effects. In one embodiment, the present disclosure built upon these subtle differences in uncertainty for the identified change types and assigns a weight Utype to each one of them. For this variation of the heuristic, the uncertainty factor is only added to the scoring function (i.e., scoring factor). It is not propagated, and only the number of interactions is relevant for the nodes' state values.

Uncertainty Propagation (ST Unc Prop) variation of Table 1 considers uncertainty also as a propagation factor. Consequently, instead of the number of edges, the uncertainty values associated to the individual edges' change types are summed up within a subtree. The rationale behind this approach is to emphasize the uncertainty of subtrees involving many changes. For example, when multiple newly deployed services call each other, high uncertainty is introduced, resulting in a higher ranking of the involved changes.

The Penalty (ST Pen) variation of Table 1 introduces penalties P that are added to the score of those interactions for which certain deviations are measured, e.g., significant changes in error rates (i.e., error rate degradation) or response times. The approach is to provide a simple way to account for performance issues without running in depth root-cause analyses. This penalization applies to all interactions for which direct comparisons between the variants on the edge-level are possible, i.e., all change types and common calls.

The Uncertainty Prop. and Penalty (ST Unc Prop & Pen) variation of Table 1 combines the concept of uncertainty with the possibility of applying simple penalties. While uncertainty values are propagated, individual penalties are added to the scoring function.

Example Visualization of Identified Changes

Figure 11:
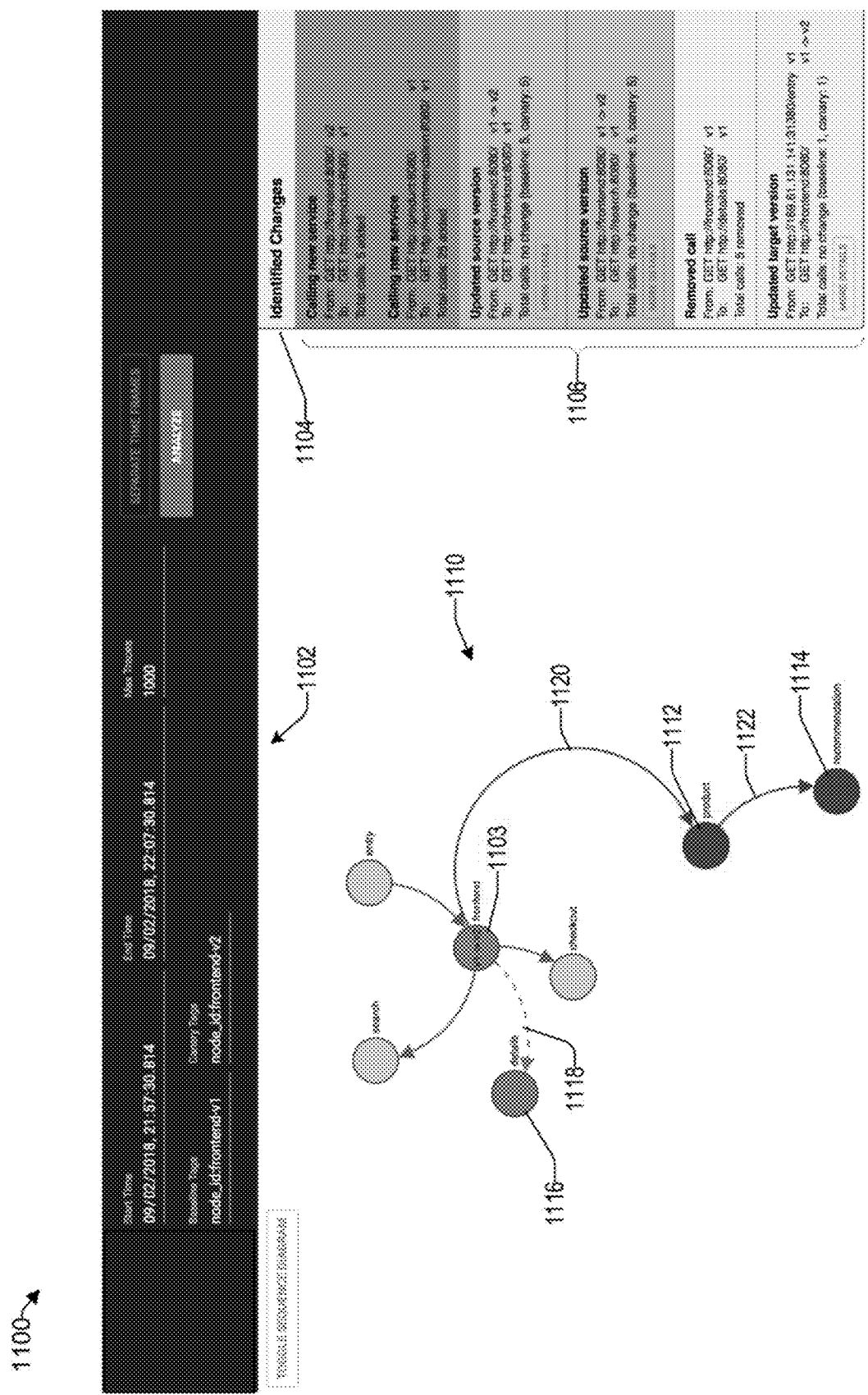
FIG. 11 provides a visualization of an example user interface, consistent with an illustrative embodiment.

FIG. 11 provides a visualization 1100 of an example user interface, consistent with an illustrative embodiment. The visualization 1100 includes a microservice map 1110 depicting topological differences of a microservice-based application. In particular, the example microservice map 1110 indicates that the microservice-based application has a new version of the frontend 1103, which no longer calls on the details microservice 1116. Instead, the frontend microservice 1103 invokes a product microservice 1112, which in turn invokes a recommendation microservice 1114. The remaining microservices remain unchanged.

In various embodiments, different types of highlighting can be used to efficiently and clearly raise awareness of the changes. For example, new microservices (e.g., 1112 and 1114) and the paths thereto (e.g., 1120 and 1122) can be marked in green; a new version of a microservice (e.g., 1103) can be marked in yellow; removal of a microservice (e.g., 116) and the path thereto 118 can be marked in red; etc. It will be understood that other suitable color coding and/or patterns can be used as well.

In one embodiment, the top heading portion of the screen 1102 includes a summary of the input conditions governing the analysis. The identified changes 1104, ranked according to predetermined parameters, are provided on one the right side of the screen 1106 and may be color coded as well. Accordingly, by virtue of providing a clear visual interface that summarizes the health of a microservice-based application and by displaying the identified changes between the different versions, a developer of a microservice-based application can gain a rapid and clear visual understanding of a potentially complex microservices-based application by highlighting changes in the microservices used and their potential impact on the health state of the microservices-based application.

Example Process

Figure 12:
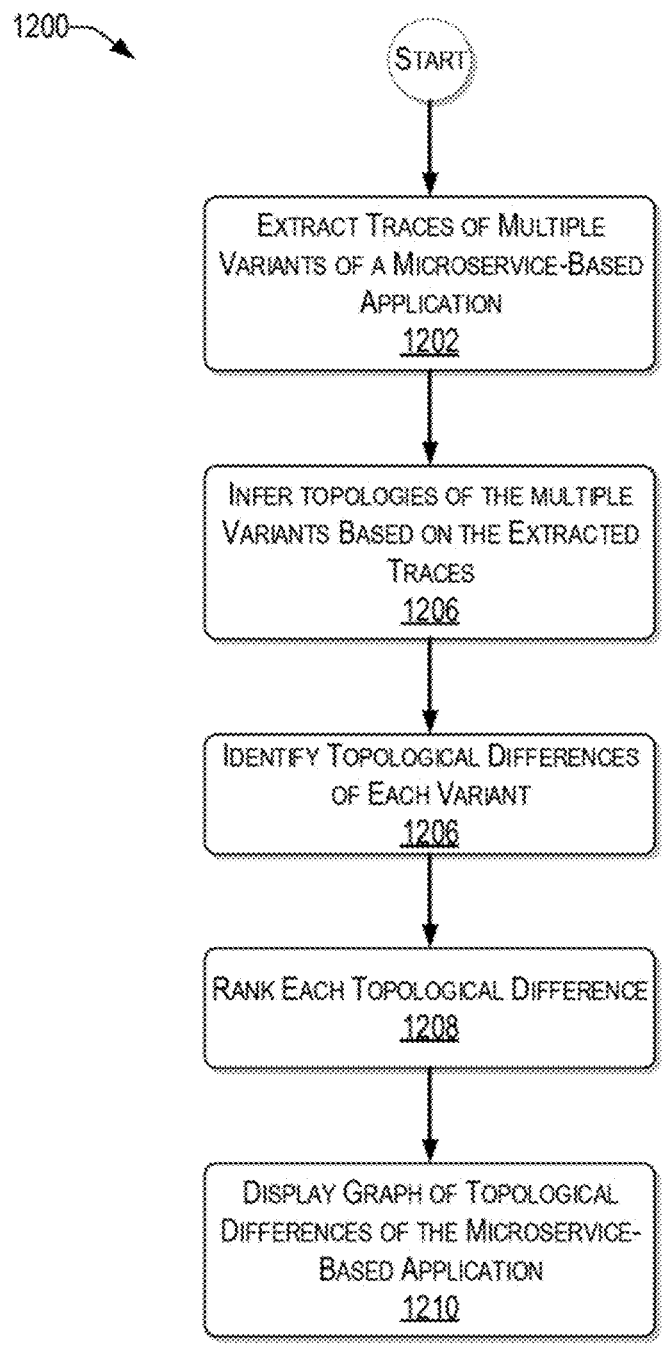
FIG. 12 presents a process for determining a health state of a microservice-based application, consistent with an illustrative embodiment.

With the foregoing overview of the identification and visualization of topological differences of the variants of microservice-based applications, it may be helpful now to consider a high-level discussion of an example process. To that end, FIG. 12 presents a process 1200 for determining a health state of a microservice based application, consistent with an illustrative embodiment. Process 1200 is illustrated as a collection of processes in a logical flowchart, wherein each block represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

At block 1202, a monitoring engine extracts traces of multiple variants of a microservice-based application. In various embodiments, different distributed tracing tools, such as ZipKin, Jaeger, and/or Istio can be used, to provide a microservice architecture for one or more separate variants of the microservice-based application. In one embodiment, the timing information is filtered out from the extracted traces. What remains are the traces, thereby reducing the volume of data to be processed by the monitoring engine and hence the workload on the computing device of the monitoring engine.

At block 1204, topologies of the multiple variants of the microservice-based application are inferred based on the extracted traces.

At block 1206, one or more topological differences of each variant are identified based on the extracted traces. Topologies are compared and fine-grained topological changes are identified. In one embodiment, the comparison is fine-grained in that it reaches every endpoint-level of every microservice used by the microservice-based application. Topological difference can include the location within call traces where the changes among the variants took place.

At block 1208, each identified topological difference is ranked. In one embodiment, the ranking is based on the potential impact of the identified topological difference, to the health state of the microservice-based application. In one embodiment, microservices that are deemed by the monitoring engine to be more critical to the microservice-based application are attributed a higher weighting factor. In this way, any changes associated therewith will be attributed a higher weighting factor. In various embodiments, the parameters (e.g., criteria) for assigning the weighting factors can be provided by a database associated with the microservice-based application or identified by the monitoring engine based on the type of microservice-based application. In one embodiment, a lower weighting factor is assigned to changes that are farther down the subtree of a microservice map.

In one embodiment, in addition or alternative to the ranking, a change complexity of each subtree is performed by the monitoring engine, with respect to a changed microservice. The subtree change factor calculates a number of changes for every subtree emanating from each of the subject changed microservices.

At block 1210, the monitoring engine creates a data packet including information which is to be displayed on a user interface (i.e., display) of a computing device. More particularly, a graph of the topological differences of the microservice-based application is provided. The user interface can include the ranking of the topological differences and/or the calculated change complexity next to each subtree.

In one embodiment, if a subtree has a change in complexity that is above a predetermined first threshold then the associated changed microservice is rolled back to the previous (i.e., stable) microservice. In some scenarios, each subtree of a microservice may have a change in complexity that is at or below the predetermined first threshold but may have many subtrees emanating therefrom. In this regard, in one embodiment, if the sum of change in complexity of all subtrees emanating from a changed microservice is above a second predetermined threshold, then the microservice is rolled back to the previous version thereof.

Example Computer Platform

Figure 13:
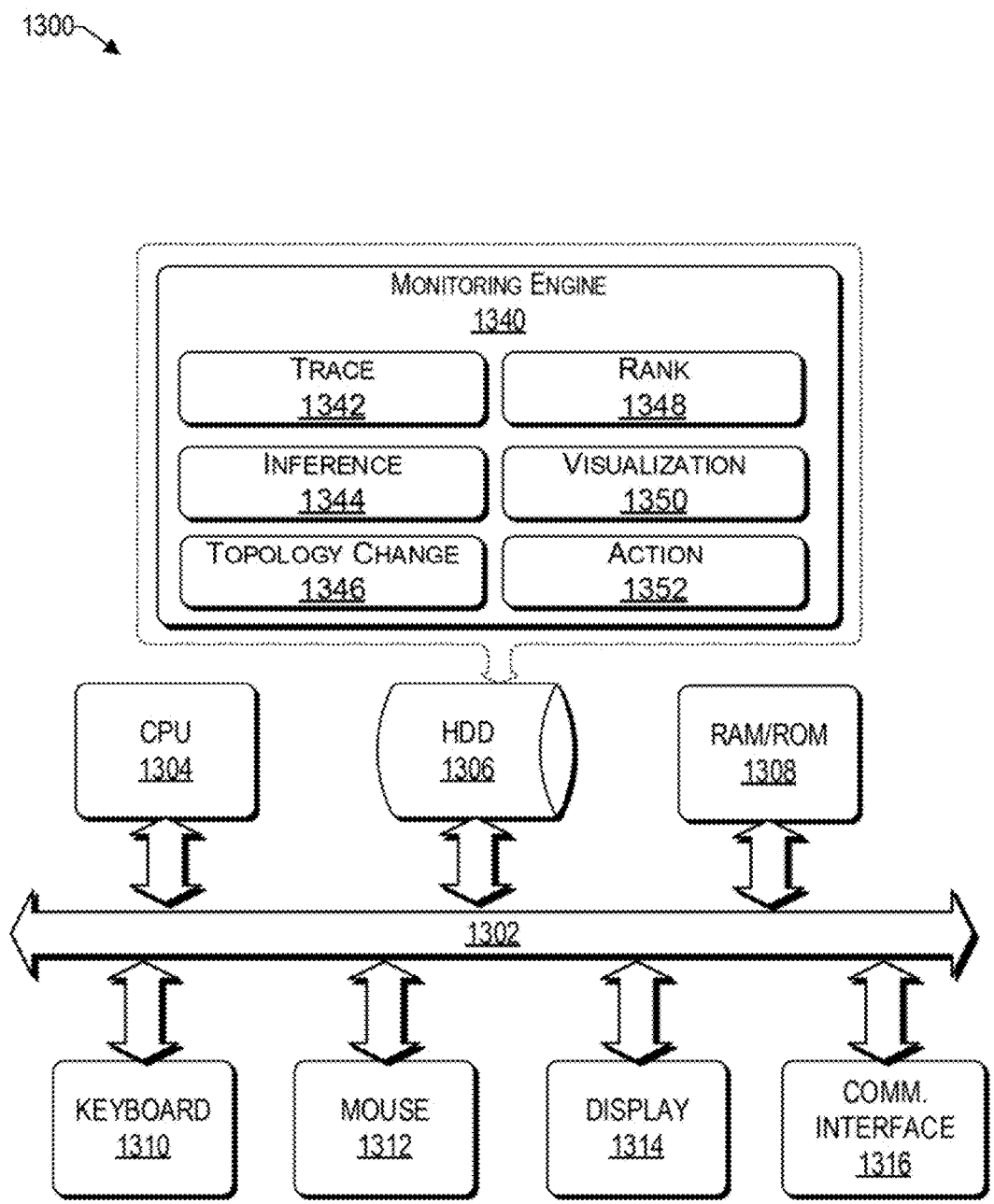
FIG. 13 is a functional block diagram illustration of a computer hardware platform that can communicate with various networked components.

As discussed above, functions relating to monitoring the health of a microservice-based application can be performed with the use of one or more computing devices connected for data communication via wireless or wired communication. FIG. 13 is a functional block diagram illustration of a computer hardware platform that can communicate with various networked components, such as various versions of a microservice-based application. In particular, FIG. 13 illustrates a network or host computer platform 1300, as may be used to implement a server, such as an appropriately configured server running the monitoring engine 108 of FIG. 1.

The computer platform 1300 may include a central processing unit (CPU) 1304, a hard disk drive (HDD) 1306, random access memory (RAM) and/or read only memory (ROM) 1308, a keyboard 1310, a mouse 1312, a display 1314, and a communication interface 1316, which are connected to a system bus 1302.

In one embodiment, the HDD 1306, has capabilities that include storing a program that can execute various processes, such as the monitoring engine 1340, in a manner described herein. The monitoring engine 1340 may have various modules configured to perform different functions. For example, there may be a trace module 1342 operative to extract traces of multiple variants of a subject microservice-based application. There may be a topology inference module 1344 operative to infer the different topologies of the multiple variants of the microservice-based application. There may be a topology changes module 1346 operative to identify one or more topological differences of each variant based on the extracted traces. There may be a rank module 1348 operative to rank each topological change based on its potential impact to the health state of the evaluation and the application. There may be a graphical visualization module 1350 operative to display a graph of the topological difference of the microservice-based application on a user interface that may include a ranking of each topological change and a change complexity of each subtree thereof. In one embodiment, there is an action module 1352 that helps determine whether one or more versions (e.g., releases) of microservices of a microservice-based application should be expanded or throttled back (e.g., hotfix provided or a rollback performed to the original stable version), such that the health state of the microservice-based application is optimized.

While the various modules of the monitoring engine 1340 have been described for simplicity to be under a hard disk drive 1306, in some embodiments, one or more of the foregoing modules of the monitoring engine can be implemented in hardware, such as specially configured circuits configured to perform the functions of the modules discussed herein.

In one embodiment, a program, such as Apache™, can be stored for operating the system as a Web server. In one embodiment, the HDD 1306 can store an executing application that includes one or more library software modules, such as those for the Java™ Runtime Environment program for realizing a JVM (Java™ virtual machine).

Example Cloud Platform

As discussed above, functions relating to monitoring the health of a microservice-based application may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of microservice delivery for enabling convenient, on-demand network access to a shared pool of configurable computing resources (e.g., networks, network bandwidth, servers, processing, memory, storage, applications, virtual machines, and microservices) that can be rapidly provisioned and released with minimal management effort or interaction with a provider of the microservice. This cloud model may include at least five characteristics, at least three microservice models, and at least four deployment models.

Characteristics are as Follows:

On-demand self-service: a cloud consumer can unilaterally provision computing capabilities, such as server time and network storage, as needed automatically without requiring human interaction with the microservice's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured microservice: cloud systems automatically control and optimize resource use by leveraging a metering capability at some level of abstraction appropriate to the type of microservice (e.g., storage, processing, bandwidth, and active user accounts). Resource usage can be monitored, controlled, and reported, providing transparency for both the provider and consumer of the utilized microservice.

Service Models are as Follows:

Software as a microservice (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a microservice (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a microservice (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud microservices.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is microservice oriented with a focus on statelessness, low coupling, modularity, and semantic interoperability. At the heart of cloud computing is an infrastructure that includes a network of interconnected nodes.

Figure 14:
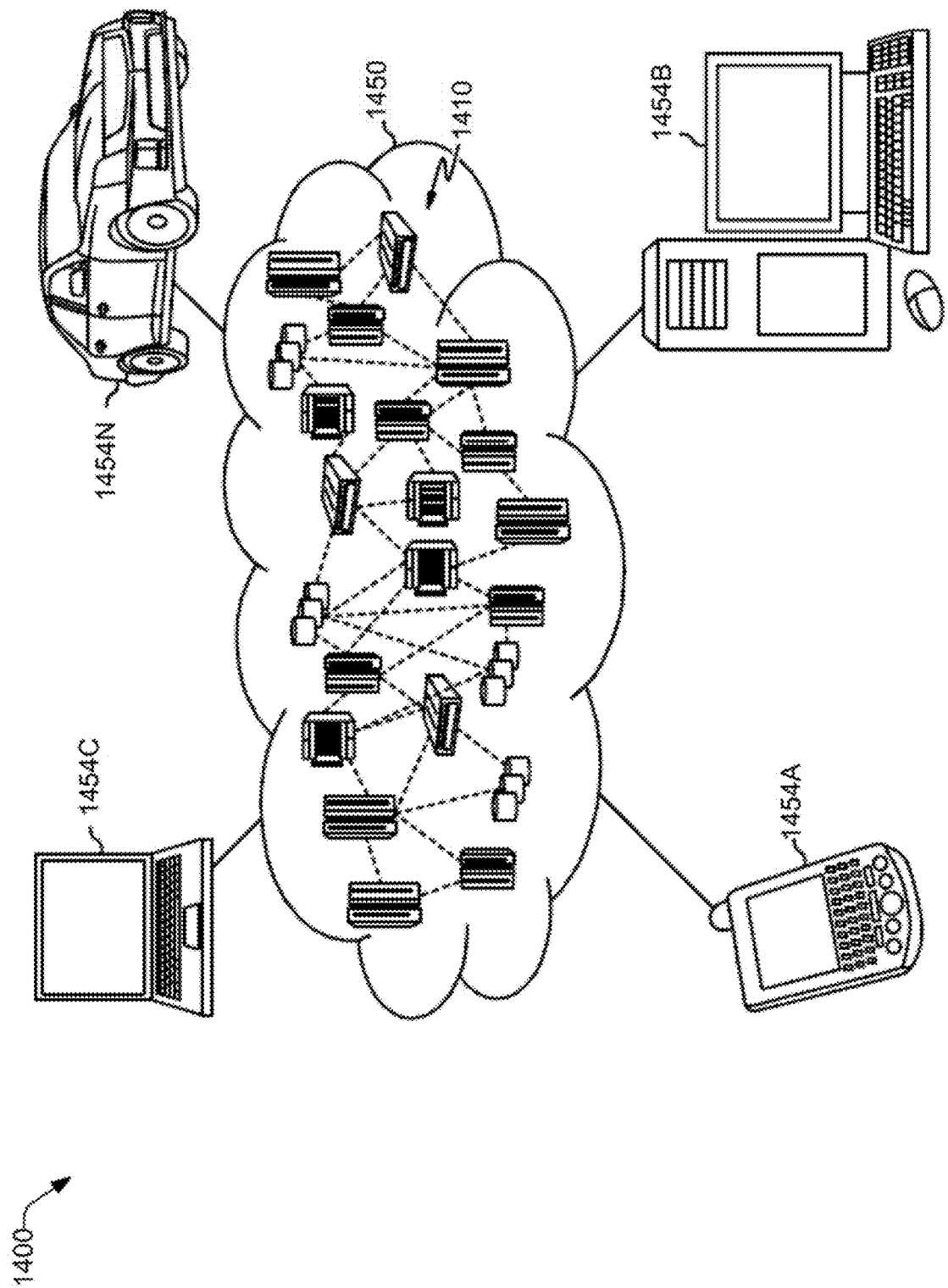
FIG. 14 depicts a cloud computing environment, consistent with an illustrative embodiment.

Referring now to FIG. 14, an illustrative cloud computing environment 1400 is depicted. As shown, cloud computing environment 1400 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as microservices for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
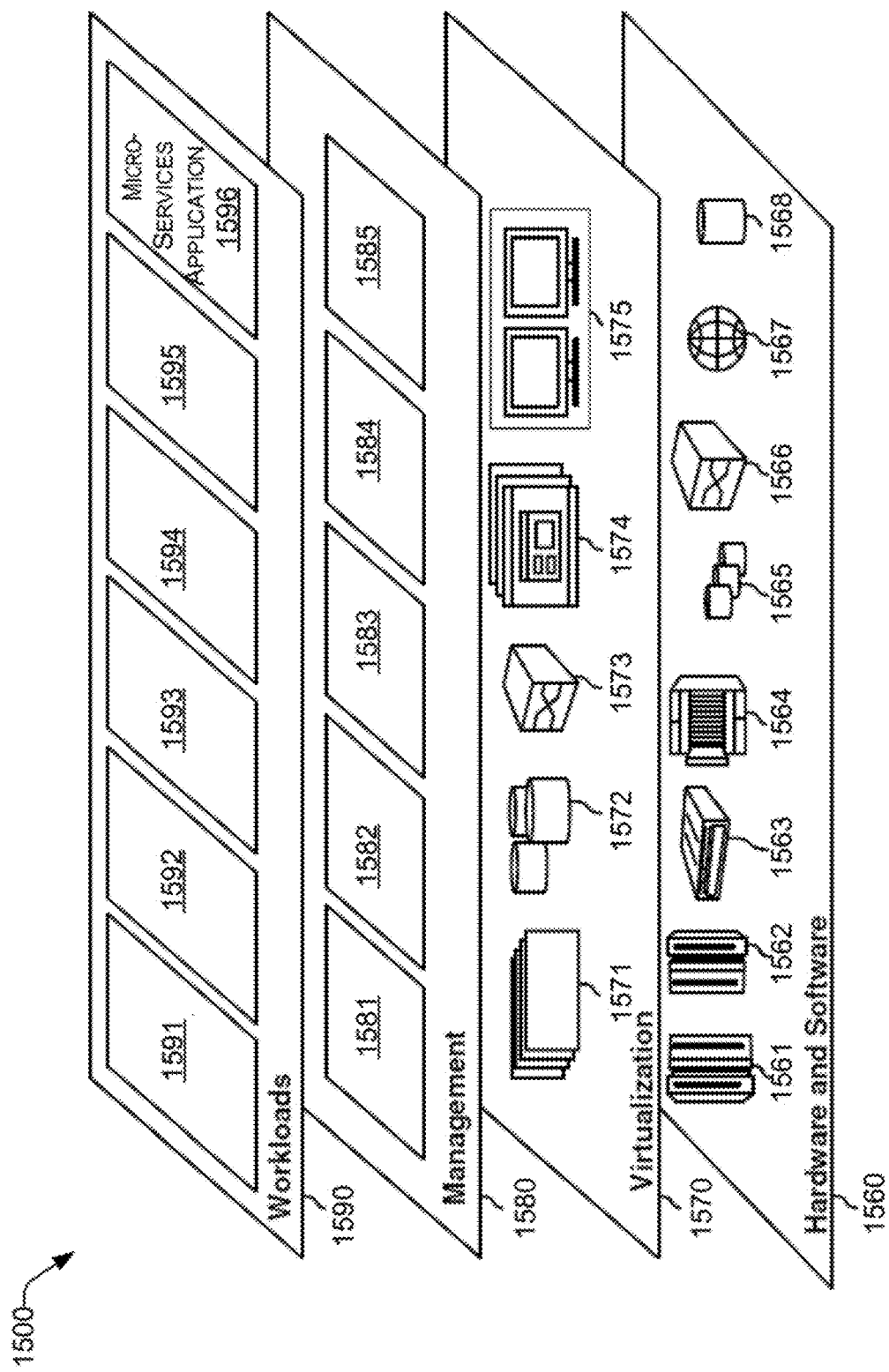
FIG. 15 depicts abstraction model layers, consistent with an illustrative embodiment.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the disclosure are not limited thereto. As depicted, the following layers and corresponding functions are provided:

Hardware and software layer 1560 includes hardware and software components. Examples of hardware components include: mainframes 1561; RISC (Reduced Instruction Set Computer) architecture-based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. microservice level management 1584 provides cloud computing resource allocation and management such that required microservice levels are met. microservice Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and microservices and microservice-based applications 1596, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a storage device coupled to the processor;
a monitoring engine software stored in the storage device, wherein an execution of the monitoring engine by the processor configures the computing device to perform acts comprising:
extracting traces of multiple variants of a microservice-based application;
inferring topologies of the multiple variants based on the extracted traces;
identifying one or more topological differences of each of the multiple variants based on the extracted traces;
ranking each topological difference; and
displaying the topological differences of the microservice-based application, including a common microservice map of the topological differences and a listing of a top ranking of the topological differences, on a user interface.

2. The computing device of claim 1, wherein each topological difference is a result of a new version of a microservice used by the microservice-based application.

3. The computing device of claim 1, wherein execution of the monitoring engine further configures the computing device to perform acts comprising: calculating a change complexity value of each subtree originating from a new version of a microservice used by the microservice-based application.

4. The computing device of claim 3, wherein the displayed topological differences include a representation of the change in complexity factor at a root of each subtree.

5. The computing device of claim 1, wherein ranking each topological difference comprises assigning a weighting factor to each microservice in the common microservice map, based on predetermined one or more criteria.

6. The computing device of claim 5, wherein the one or more criteria include assigning a lower weighting factor to a topological difference the farther down a subtree originating from a front end of a microservice-based application the topological difference is.

7. The computing device of claim 5, wherein:
the common microservice map comprises one or more subtrees; and
for each subtree, the weighting factor of each microservice is additive between microservices of the subtree from an endpoint of the subtree to a root of the subtree.

8. The computing device of claim 5, wherein the predetermined criteria for each weighting factor comprises:
assigning a first weighting factor for a call to a common microservice;
assigning a second weighting factor that is larger than the first weighting factor for a removed call to a microservice;
assigning a third weighting factor that is larger than the second weighting factor for an updated source microservice; and
assigning a fourth weighting factor that is larger than the third weighting factor for a new microservice.

9. The computing device of claim 5, wherein the predetermined criteria for each weighting factor comprises error-rate degradation.

10. The computing device of claim 7, wherein ranking each topological difference comprises:
determining a subtree change factor for each subtree of a topology by calculating, for each subtree, a number of changes for every subtree; and for each subtree, assigning a higher ranking to the subtree, the larger the number of changes for the subtree.

11. The computing device of claim 7, wherein identifying one or more topological differences of each of the multiple variants of the microservice-based application comprises:
 comparing topologies of each of the multiple variants; and
 identifying topological changes by reaching every endpoint level of every microservice used by the microservice-based application.

12. A non-transitory computer readable storage medium tangibly embodying a computer readable program code having computer readable instructions that, when executed, causes a computer device to carry out a method comprising:
 extracting traces of multiple variants of a microservice-based application;
 inferring topologies of the multiple variants based on the extracted traces;
 identifying one or more topological differences of each of the multiple variants based on the extracted traces;
 ranking each topological difference; and
 displaying the topological differences of the microservice-based application, including a common microservice map of the topological differences and a listing of a top ranking of the topological differences, on a user interface.

13. The non-transitory computer readable storage medium of claim 12, wherein each topological difference is a result of a new version of a microservice used by the microservice-based application.

14. The non-transitory computer readable storage medium of claim 12, further comprising calculating a change complexity value of each subtree originating from a new version of a microservice used by the microservice-based application.

15. The non-transitory computer readable storage medium of claim 12, wherein ranking each topological difference comprises assigning a weighting factor to each microservice in the common microservice map, based on predetermined one or more criteria.

16. The non-transitory computer readable storage medium of claim 15, wherein the one or more criteria include assigning a lower weighting factor to a topological difference the farther down a subtree originating from a front end of a microservice-based application the topological difference is.

17. The non-transitory computer readable storage medium of claim 15, wherein:
 the common microservice map comprises one or more subtrees; and
 for each subtree, the weighting factor of each microservice is additive between microservices of the subtree from, an endpoint of the subtree to a root of the subtree.

18. The non-transitory computer readable storage medium of claim 15, wherein, the predetermined criteria for each weighting factor comprises:
 assigning a first weighting factor for a call to a common microservice;
 assigning a second weighting factor that is larger than the first weighting factor for a removed call to a microservice;
 assigning a third weighting factor that is larger than the second weighting factor for an updated source microservice; and
 assigning a fourth weighting factor that is larger than the third weighting factor for a new microservice.

19. The non-transitory computer readable storage medium of claim 12, wherein ranking each topological difference comprises:
 determining a subtree change factor for each subtree of a topology by calculating, for each subtree, a number of changes for every subtree; and
 for each subtree, assigning a higher ranking to the subtree, the larger the number of changes for the subtree.

20. The non-transitory computer readable storage medium of claim 12, wherein identifying one or more topological differences of each of the multiple variants of the microservice-based application comprises:
 comparing topologies of each of the multiple variants; and
 identifying topological changes by reaching every endpoint level of every microservice used by the microservice-based application.

* * * * *